Figure 1:
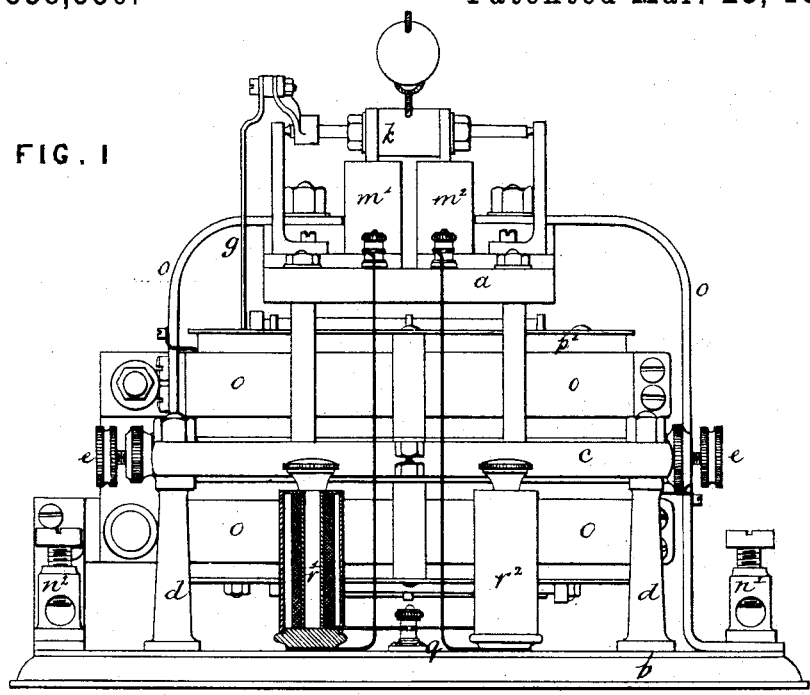

(No Model.) 3 Sheets—Sheet 1.

J. S. RAWORTH.
AUTOMATIC ELECTRIC COUPLER.

No. 338,550. Patented Mar. 23, 1886.

Witnesses
Inventor
John S. Raworth
By L. S. Whitman Atty (No Model) 3 Sheets—Sheet 2.

J. S. RAWORTH.
AUTOMATIC ELECTRIC COUPLER.

No. 338,550. Patented Mar. 23, 1886.

(No Model.)

3 Sheets—Sheet 3.

J. S. RAWORTH.
AUTOMATIC ELECTRIC COUPLER.

No. 338,550. Patented Mar. 23, 1886.

UNITED STATES PATENT OFFICE.

JOHN SMITH RAWORTH, OF MANCHESTER, COUNTY OF LANCASTER, ASSIGNOR TO SIEMENS BROTHERS & COMPANY, (LIMITED,) OF WESTMINSTER, COUNTY OF MIDDLESEX, ENGLAND.

AUTOMATIC ELECTRIC COUPLER.

SPECIFICATION forming part of Letters Patent No. 338,550, dated March 23, 1886.

Application filed September 12, 1885. Serial No. 176,930. (No model.) Patented in England March 5, 1885, No. 2,924; in France August 11, 1885, No. 170,591, and in Belgium August 11, 1885, No. 69,878.

*To all whom it may concern:*

Be it known that I, JOHN SMITH RAWORTH, a subject of the Queen of Great Britain, residing at Manchester, in the county of Lancaster, England, have invented a new and useful Automatic Electric Coupler, (for which I have made application for a patent in Great Britain, dated March 5, 1885, No. 2,924,) of which the following is a specification.

This invention relates to an improved method of coupling a dynamo-electric machine (or other variable source of electric energy) with the main leading-wires in cases where two or more machines are working parallel, or where one or more machines are working parallel with primary or secondary batteries; and the object of this invention is to effect the connecting or coupling of the machine with the leads automatically so soon as the difference of potential at the terminals of the machine become slightly higher than in the adjacent portions of the main leads, and to break the connection whenever the electro-motive force of the machine falls so low that current ceases to flow from the machine to the main leads, thus preventing the magnetism of the machine from being reversed by current passing through it in the wrong direction.

The automatic coupler consists of a magnet or electro-magnet, balanced on pivots and influenced by three solenoids. Two of high resistance are shunts between the main leads and between the machine terminals, respectively, and are arranged to have opposing influences upon the magnet, so that when the strengths of currents in the two solenoids are equal the magnet will not move; but if the current due to the machine preponderates, the magnet will turn in one direction on its pivots and make the connection between the machine and the leads. As soon as this connection is made, the currents in the two shunt solenoids become equalized, and the magnet would lose its bias if it were not for the third solenoid, which is of low resistance, and carries either the whole or an adequate portion of the main current. The magnet is weighted on one side, so that it will break connection with the main leads whenever the current ceases to flow through the solenoid of low resistance. If it should fail to act and current should commence to come back through the machine, this reverse current will instantly move the magnet and break the connection.

I prefer to make these automatic couplers with electro-magnets excited by two coils, each being in series with one of the above-mentioned high-resistance solenoids; but these exciting-coils act in unison and are not opposed in their effect, seeing that they have no tendency to move the magnet, but only to make it susceptible to the influence of the solenoids.

The construction which I prefer to adopt is somewhat similar to that which I have described in another application, filed February 25, 1885, for electric meter, wherein a magnet is supported on pivots within a solenoid and excited by coils of wire around the axis which connects the pole-pieces. I have also found advantage in forming extensions on the ends of the pole-pieces at right angles thereto—that is to say, parallel with the axis. The actual connection between the machine and the leads is made by copper forks dipping into troughs of mercury, which forks are moved in either direction by the above-described magnet.

Figure 3:
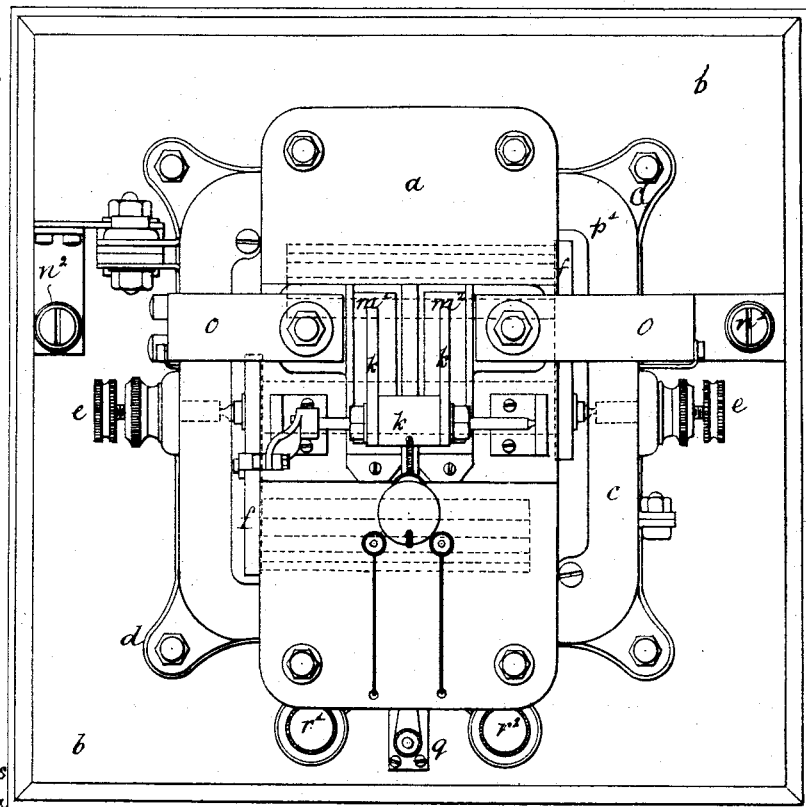
Figure 2:
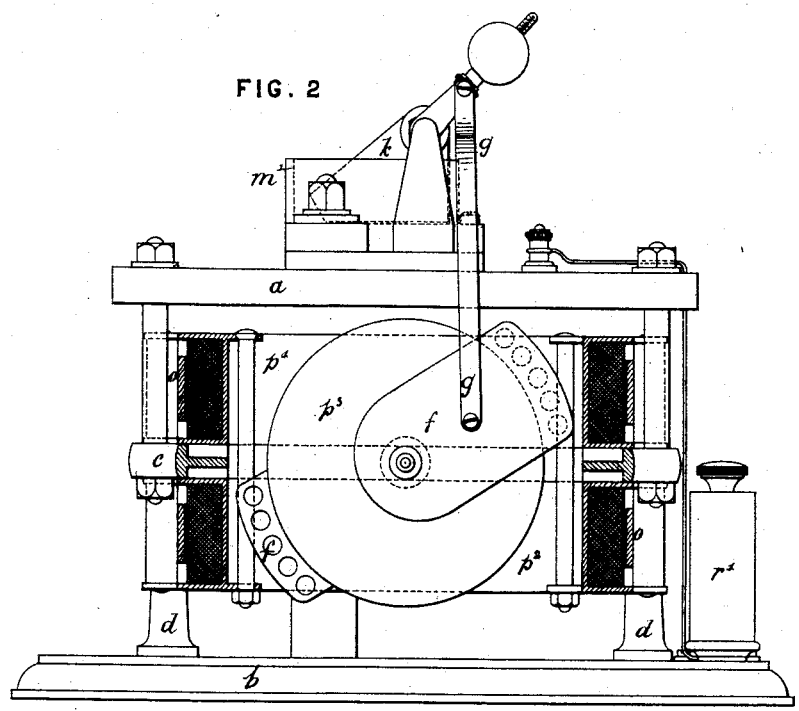
Figure 4:
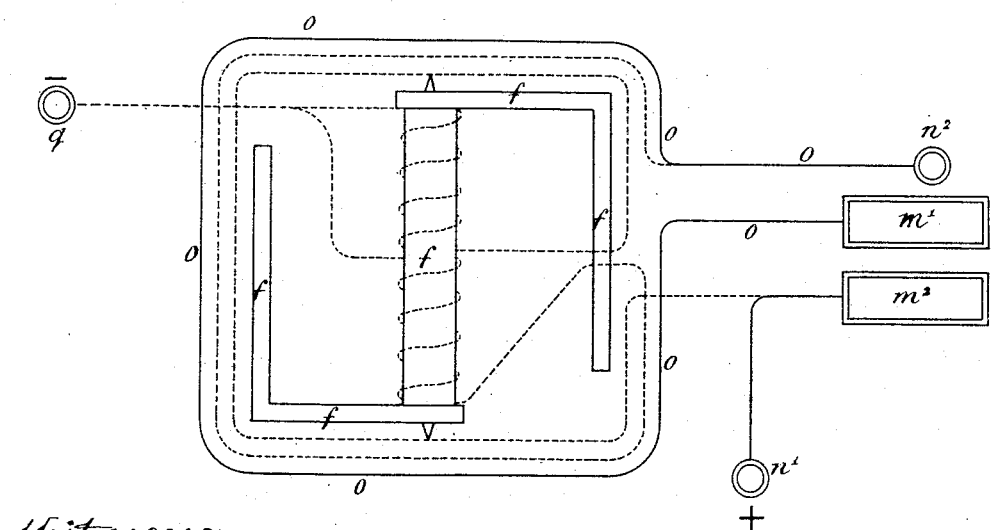
Figure 5:
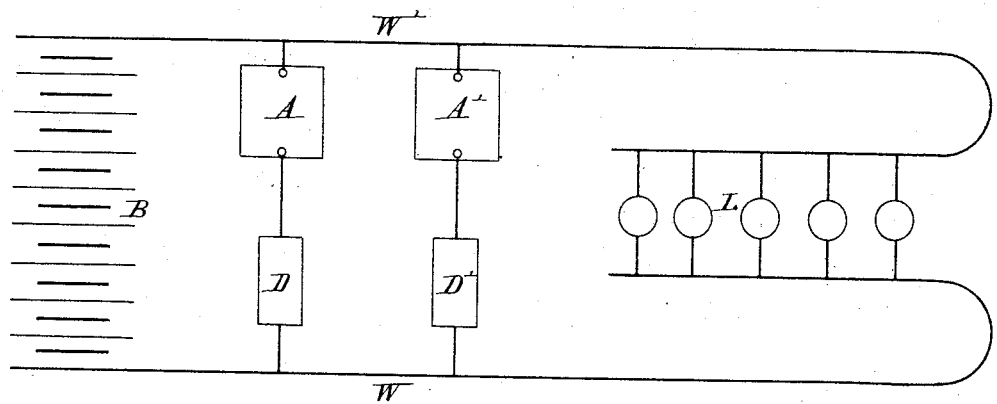

Figure 1 of the accompanying drawings is a front elevation, Fig. 2 a side elevation partly in section, and Fig. 3 a plan, of an automatic electric coupler according to my invention. Figs. 4 and 5 are diagrams showing the electric connections.

In all the figures similar parts are indicated by similar letters.

$a$ is a table, and $b$ a base, made of any strong insulating material—such as wood, slate, ebonite, or the like. $c$ is a frame carried by four pillars, $d$, standing up from the base $b$. This frame $c$ carries two screw-centers, $e\,e$, supporting the pivots of the balanced electro-magnet $f$, which is free to turn on its pivots through a considerable angle, and is connected by a link, $g$, to a copper dipper, $k$. According as the magnet $f$ turns in the one direction or the other it causes the dipper $k$ to become immersed into or to rise out of mercury in two cups, $m'$ and $m^2$.

The positive conductor from the machine to which the coupler is applied is fixed to the terminal $n'$, and the main leading wire of the outer circuit is connected by a wire with the binding-screw $n^2$. Consequently when the dipper $k$ enters the mercury the machine is in direct communication with the outer circuit. The return-wire from the outer circuit is permanently connected with the negative conductors of the dynamo-machines or other sources of electric energy.

The instrument contains one circuit of low resistance and two circuits of high resistance. The low-resistance circuit carries the full current of the dynamo-machine from the terminal $n'$ to the terminal $n^2$, through the copper band $o$, which is for the most part wrapped round the two bobbins or frames $p'$ $p^2$, which carry part of the fine wire of the two circuits of high resistance. The first circuit of high resistance starts from the terminal $n'$, and after making a great number of revolutions round the bobbin or frame $p'$ crosses over to the central bobbin, $p^3$, which surrounds the axis of the electro-magnet $f$, and after making a great number of turns round it finally joins the main negative conductor at $q$. The second high-resistance circuit starts from the terminal $n^2$, and after making a great number of convolutions round the bobbin or frame $p^2$ crosses over to the central bobbin, $p^3$, which surrounds the axis of the electro-magnet $f$, and after making a great number of turns round it finally joins the main negative conductor at $q$.

The difference between the two circuits of high resistance consists in their being wound in opposite directions on the deflecting-bobbins $p'$ $p^2$, while they are wound in the same direction round the magnetizing-bobbin $p^3$. They therefore both tend to produce similar polarity in the electro-magnet $f$; but their deflecting actions are opposed to each other. Thus the current which passes from the main positive conductor to the main negative conductor through the coil wound on the bobbin $p^2$ constantly tends to hold the dipper $k$ out of the mercury, while the current which passes from the positive pole of the dynamo-machine through the coil wound on the bobbin $p^2$ constantly tends to immerse the dipper $k$ in the mercury. So long, therefore, as the difference of potential in the main leads exceeds that at the terminals of the dynamo-machine the dipper $k$ cannot enter the mercury, and the machine is kept out of circuit; but a rise of one or two volts in favor of the dynamo-machine is sufficient to cause the dipper to enter the mercury, and so to establish the connection between the dynamo and the leads. The main current from the dynamo then flows through the circuit of low resistance, following the copper band $o$, which is arranged to incline the dipper $k$ to remain immersed in the mercury-cup as long as any current continues to pass from the dynamo-machine to the leads.

Small resistance-coils $r'$ $r^2$, included in one of the circuits of high resistance, serve to adjust those resistances so that the dipper may enter the mercury when the potential in the dynamo-machine exceeds that in the leads by any prearranged number of volts.

Fig. 5 shows diagrammatically how two automatic couplers, such as are above described, A and A', can be applied in a circuit with two dynamo-electric machines, D and D, a secondary or storage battery, B, a number of lamps, L, and the conductors W W', respectively, and assuming the battery B to have been charged by the action of the dynamo-machine D, and then the speed of the machine D to have been reduced, so that there would tend to be a return current from the battery passing through the coils of D, neutralizing and reversing the polarity of its magnets, then, owing to the circumstance that the difference of potential at the terminals of the machine D would in that case be less than that in the adjacent partitions of the main leads W W', the coupler A would come into action, uncoupling the machine D from the leads W W'; or, conversely, if the difference of potential in the leads W W' were less than that at the terminals of D, the coupler A would connect D to the leads.

Having thus described the nature of my invention, and the best means I know for carrying the same into practical effect, I claim—

1. In an automatic coupler for connecting and disconnecting a dynamo-machine and a circuit, the combination of a magnet or electro-magnet balanced on a pivot with two solenoids of high resistance, as and for the purpose described.

2. In an automatic coupler for connecting and disconnecting a dynamo-machine and a circuit, an electro-magnet excited by two coils, each of which is in series with a high-resistance solenoid, as and for the purpose described.

3. A magnet the movement of which connects and disconnects a dynamo-machine and a circuit, in combination with two highly-resisting shunt-coils connecting, respectively, the terminals of the machine and those of the circuit, substantially as described.

4. The combination of the low-resistance circuit, which carries the full current of the dynamo-machine from the terminal $n'$ to the terminal $n^2$, the two circuits of high resistance wound in opposite directions on the deflecting-bobbin and the magnetizing-bobbin, as and for the purpose described.

5. In an automatic coupler for connecting and disconnecting a dynamo-machine and a circuit, the combination of a magnet or electro-magnet balanced on a pivot with two solenoids of high resistance and two small resistance-coils, $r'$ $r^2$, included in one of the circuits of high resistance, as and for the purpose described.

6. The combination of the frame $c$, supporting the pivots of the balanced electro-magnet, the balanced electro-magnet $f$, which is free to turn on its pivots, the link $g$, the dipper $k$, and the cups $m'$ $m^2$, as and for the purpose described.

7. In an electric coupler, in combination with the magnet and the two shunt-coils, a low-resistance coil, which, according to the direction of current through it, assists the one or the other of the shunt-coils in its action on the magnet, substantially as and for the purpose set forth.

In testimony whereof I have signed my name to this specification, in the presence of two subscribing witnesses, this 13th day of August, A. D. 1885.

JOHN SMITH RAWORTH.

Witnesses:
CHAS. W. DORMAN,
    31 *Ackers St., Manchester.*
JOHN WM. MACLEAN,
    50 *Bishop St., Manchester.*